(12) United States Patent
Kachmar et al.

(10) Patent No.: US 11,842,056 B2
(45) Date of Patent: Dec. 12, 2023

(54) SYSTEM AND METHOD FOR ALLOCATING STORAGE SYSTEM RESOURCES DURING WRITE THROTTLING

(71) Applicant: EMC IP Holding Company, LLC, Hopkinton, MA (US)

(72) Inventors: Maher Kachmar, Marlborough, MA (US); Philippe Armangau, Acton, MA (US); Michael P. Wahl, Bulverde, TX (US); Vamsi K. Vankamamidi, Hopkinton, MA (US); Socheavy D. Heng, Framingham, MA (US); Yubing Wang, Southborough, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 26 days.

(21) Appl. No.: 17/509,308

(22) Filed: Oct. 25, 2021

(65) Prior Publication Data
US 2023/0129182 A1   Apr. 27, 2023

(51) Int. Cl.
*G06F 12/00* (2006.01)
*G06F 13/00* (2006.01)
*G06F 3/06* (2006.01)

(52) U.S. Cl.
CPC ............ *G06F 3/0631* (2013.01); *G06F 3/061* (2013.01); *G06F 3/067* (2013.01); *G06F 3/0635* (2013.01); *G06F 3/0659* (2013.01)

(58) Field of Classification Search
CPC ...... G06F 3/0631; G06F 3/061; G06F 3/0635; G06F 3/0659; G06F 3/067

USPC ......................................................... 711/154
See application file for complete search history.

(56) References Cited

U.S. PATENT DOCUMENTS

| 6,704,817 | B1 * | 3/2004 | Steinman ............ | G06F 13/4059 710/305 |
| 8,195,858 | B1 * | 6/2012 | Keil ..................... | G06F 12/0859 710/117 |
| 8,321,618 | B1 * | 11/2012 | Keil ..................... | G06F 13/1605 710/310 |
| 8,706,925 | B2 * | 4/2014 | Biswas ............... | G06F 13/1668 718/102 |
| 9,760,392 | B1 * | 9/2017 | Dantkale .............. | G06F 9/45558 |
| 10,996,888 | B2 * | 5/2021 | Bains ................... | G06F 3/0659 |
| 2004/0153524 | A1 * | 8/2004 | Kang ......................... | G06F 5/12 709/213 |

(Continued)

*Primary Examiner* — Sheng Jen Tsai
(74) *Attorney, Agent, or Firm* — Brian J. Colandreo; Heath M. Sargeant; Holland & Knight LLP

(57) ABSTRACT

A method, computer program product, and computing system for allocating a first number of tokens from a plurality of tokens for processing read IO requests from a read IO queue, thus defining a number of allocated read tokens. A second number of tokens may be allocated from the plurality of tokens for processing write IO requests from a write IO queue, thus defining a number of allocated write tokens. It may be determined that the processing of the write IO requests is throttled. In response to determining that the processing of the write IO requests from the write IO queue is throttled, a maximum allowable number of write tokens may be defined. Additional tokens may be allocated for processing the read IO requests from the read IO queue based upon, at least in part, the maximum allowable number of write tokens and the number of allocated write tokens.

18 Claims, 6 Drawing Sheets

(56) References Cited

U.S. PATENT DOCUMENTS

| | | | |
|---|---|---|---|
| 2006/0256941 A1* | 11/2006 | Kahn | H04W 4/24 379/114.01 |
| 2010/0094806 A1* | 4/2010 | Apostolides | G06F 12/0815 709/248 |
| 2011/0122691 A1* | 5/2011 | Sprouse | G06F 1/28 365/185.17 |
| 2012/0066690 A1* | 3/2012 | Gupta | G06F 9/526 712/28 |
| 2012/0069034 A1* | 3/2012 | Biswas | G06F 9/5033 711/170 |
| 2012/0072677 A1* | 3/2012 | Biswas | G06F 13/18 711/149 |
| 2012/0072678 A1* | 3/2012 | Biswas | G06F 13/1684 711/E12.001 |
| 2012/0072679 A1* | 3/2012 | Biswas | G06F 13/1642 711/E12.001 |
| 2012/0137078 A1* | 5/2012 | Biswas | G06F 13/1673 711/E12.001 |
| 2012/0137090 A1* | 5/2012 | Biswas | G06F 12/1018 711/E12.001 |
| 2013/0054902 A1* | 2/2013 | Biswas | G06F 13/1668 711/E12.001 |
| 2013/0080679 A1* | 3/2013 | Bert | G06F 13/1668 711/E12.008 |
| 2014/0089592 A1* | 3/2014 | Biswas | G06F 1/3275 711/E12.07 |
| 2014/0244899 A1* | 8/2014 | Schmier | G06F 3/0616 711/103 |
| 2014/0298058 A1* | 10/2014 | Klingauf | G06F 1/3296 713/322 |
| 2015/0149735 A1* | 5/2015 | Nale | G06F 13/1694 711/147 |
| 2016/0042259 A1* | 2/2016 | Panshin | G06K 15/4065 358/1.14 |
| 2017/0031412 A1* | 2/2017 | Gendler | G06F 1/3293 |
| 2017/0315914 A1* | 11/2017 | Muralimanohar | G06F 12/0806 |
| 2018/0191706 A1* | 7/2018 | Hobson | G06F 21/60 |
| 2020/0050390 A1* | 2/2020 | Bavishi | G06F 3/0613 |
| 2020/0050391 A1* | 2/2020 | Meyerowitz | G06F 3/0685 |
| 2020/0133506 A1* | 4/2020 | Zhuo | G06F 3/0689 |
| 2021/0193243 A1* | 6/2021 | Gunderson | G11C 29/50 |
| 2021/0271610 A1* | 9/2021 | Shah | G06F 13/40 |
| 2022/0091739 A1* | 3/2022 | Kumar | G06F 3/0647 |
| 2023/0062167 A1* | 3/2023 | Agarwal | G06F 13/161 |

* cited by examiner

SYSTEM AND METHOD FOR ALLOCATING STORAGE SYSTEM RESOURCES DURING WRITE THROTTLING

BACKGROUND

Storing and safeguarding electronic content may be beneficial in modern business and elsewhere. Accordingly, various methodologies may be employed to protect and distribute such electronic content.

During the processing of input/output (IO) requests on a storage system, the processing of write IO requests may experience delays relative to the processing of read IO requests. As such, while storage resources (e.g., CPU resources, memory, etc.) allocated for the processing of the write IO requests are not being used (i.e., because of the delayed processing of the write IO requests), read IO requests are unable to receive the storage resources needed and the overall storage system efficiency may be reduced.

SUMMARY OF DISCLOSURE

In one example implementation, a computer-implemented method executed on a computing device may include, but is not limited to, allocating a first number of tokens from a plurality of tokens for processing one or more read IO requests from a read IO queue, thus defining a number of allocated read tokens. A second number of tokens may be allocated from the plurality of tokens for processing one or more write IO requests from a write IO queue, thus defining a number of allocated write tokens. It may be determined that the processing of the one or more write IO requests from the write IO queue is throttled. In response to determining that the processing of the one or more write IO requests from the write IO queue is throttled, a maximum allowable number of write tokens may be defined. One or more additional tokens may be allocated to the number of allocated read tokens for processing the one or more read IO requests from the read IO queue based upon, at least in part, the maximum allowable number of write tokens and the number of allocated write tokens.

One or more of the following example features may be included. Allocating a first number of tokens from a plurality of tokens for processing one or more read IO requests from a read IO queue may include receiving a read IO request and allocating one or more tokens from the plurality of tokens for processing the read IO request. Allocating a second number of tokens from the plurality of tokens for processing one or more write IO requests from a write IO queue may include receiving a write IO request and allocating one or more tokens from the plurality of tokens for processing the write IO request. Determining that the processing of the one or more write IO requests from the write IO queue is throttled may include determining that the processing of the one or more write IO requests from the write IO queue is below a predefined write IO request processing threshold. The maximum allowable number of write tokens may be a percentage of the total number of tokens of the plurality of tokens. Allocating one or more additional tokens to the number of allocated read tokens for processing the one or more read IO requests from the read IO queue based upon, at least in part, the maximum allowable number of write tokens and the number of allocated write tokens may include determining a number of additional tokens to allocate for processing the one or more IO read requests from the read IO queue by subtracting the maximum allowable number of write tokens from the number of allocated write tokens. It may be determined that the processing of the one or more write IO requests from the write IO queue is not throttled. The maximum allowable number of write tokens may be increased.

In another example implementation, a computer program product resides on a computer readable medium that has a plurality of instructions stored on it. When executed by a processor, the instructions cause the processor to perform operations that may include, but are not limited to, allocating a first number of tokens from a plurality of tokens for processing one or more read IO requests from a read IO queue, thus defining a number of allocated read tokens. A second number of tokens may be allocated from the plurality of tokens for processing one or more write IO requests from a write IO queue, thus defining a number of allocated write tokens. It may be determined that the processing of the one or more write IO requests from the write IO queue is throttled. In response to determining that the processing of the one or more write IO requests from the write IO queue is throttled, a maximum allowable number of write tokens may be defined. One or more additional tokens may be allocated to the number of allocated read tokens for processing the one or more read IO requests from the read IO queue based upon, at least in part, the maximum allowable number of write tokens and the number of allocated write tokens.

One or more of the following example features may be included. Allocating a first number of tokens from a plurality of tokens for processing one or more read IO requests from a read IO queue may include receiving a read IO request and allocating one or more tokens from the plurality of tokens for processing the read IO request. Allocating a second number of tokens from the plurality of tokens for processing one or more write IO requests from a write IO queue may include receiving a write IO request and allocating one or more tokens from the plurality of tokens for processing the write IO request. Determining that the processing of the one or more write IO requests from the write IO queue is throttled may include determining that the processing of the one or more write IO requests from the write IO queue is below a predefined write IO request processing threshold. The maximum allowable number of write tokens may be a percentage of the total number of tokens of the plurality of tokens. Allocating one or more additional tokens to the number of allocated read tokens for processing the one or more read IO requests from the read IO queue based upon, at least in part, the maximum allowable number of write tokens and the number of allocated write tokens may include determining a number of additional tokens to allocate for processing the one or more IO read requests from the read IO queue by subtracting the maximum allowable number of write tokens from the number of allocated write tokens. It may be determined that the processing of the one or more write IO requests from the write IO queue is not throttled. The maximum allowable number of write tokens may be increased.

In another example implementation, a computing system includes at least one processor and at least one memory architecture coupled with the at least one processor, wherein the at least one processor is configured to allocate a first number of tokens from a plurality of tokens for processing one or more read IO requests from a read IO queue, thus defining a number of allocated read tokens. The at least one processor may be further configured to allocate a second number of tokens from the plurality of tokens for processing one or more write IO requests from a write IO queue, thus defining a number of allocated write tokens. The at least one processor may be further configured to determine that the processing of the one or more write IO requests from the write IO queue is throttled. The at least one processor may be further configured to, in response to determining that the processing of the one or more write IO requests from the write IO queue is throttled, define a maximum allowable number of write tokens. The at least one processor may be further configured to allocate one or more additional tokens to the number of allocated read tokens for processing the one or more read IO requests from the read IO queue based upon, at least in part, the maximum allowable number of write tokens and the number of allocated write tokens.

One or more of the following example features may be included. Allocating a first number of tokens from a plurality of tokens for processing one or more read IO requests from a read IO queue may include receiving a read IO request and allocating one or more tokens from the plurality of tokens for processing the read IO request. Allocating a second number of tokens from the plurality of tokens for processing one or more write IO requests from a write IO queue may include receiving a write IO request and allocating one or more tokens from the plurality of tokens for processing the write IO request. Determining that the processing of the one or more write IO requests from the write IO queue is throttled may include determining that the processing of the one or more write IO requests from the write IO queue is below a predefined write IO request processing threshold. The maximum allowable number of write tokens may be a percentage of the total number of tokens of the plurality of tokens. Allocating one or more additional tokens to the number of allocated read tokens for processing the one or more read IO requests from the read IO queue based upon, at least in part, the maximum allowable number of write tokens and the number of allocated write tokens may include determining a number of additional tokens to allocate for processing the one or more IO read requests from the read IO queue by subtracting the maximum allowable number of write tokens from the number of allocated write tokens. It may be determined that the processing of the one or more write IO requests from the write IO queue is not throttled. The maximum allowable number of write tokens may be increased.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
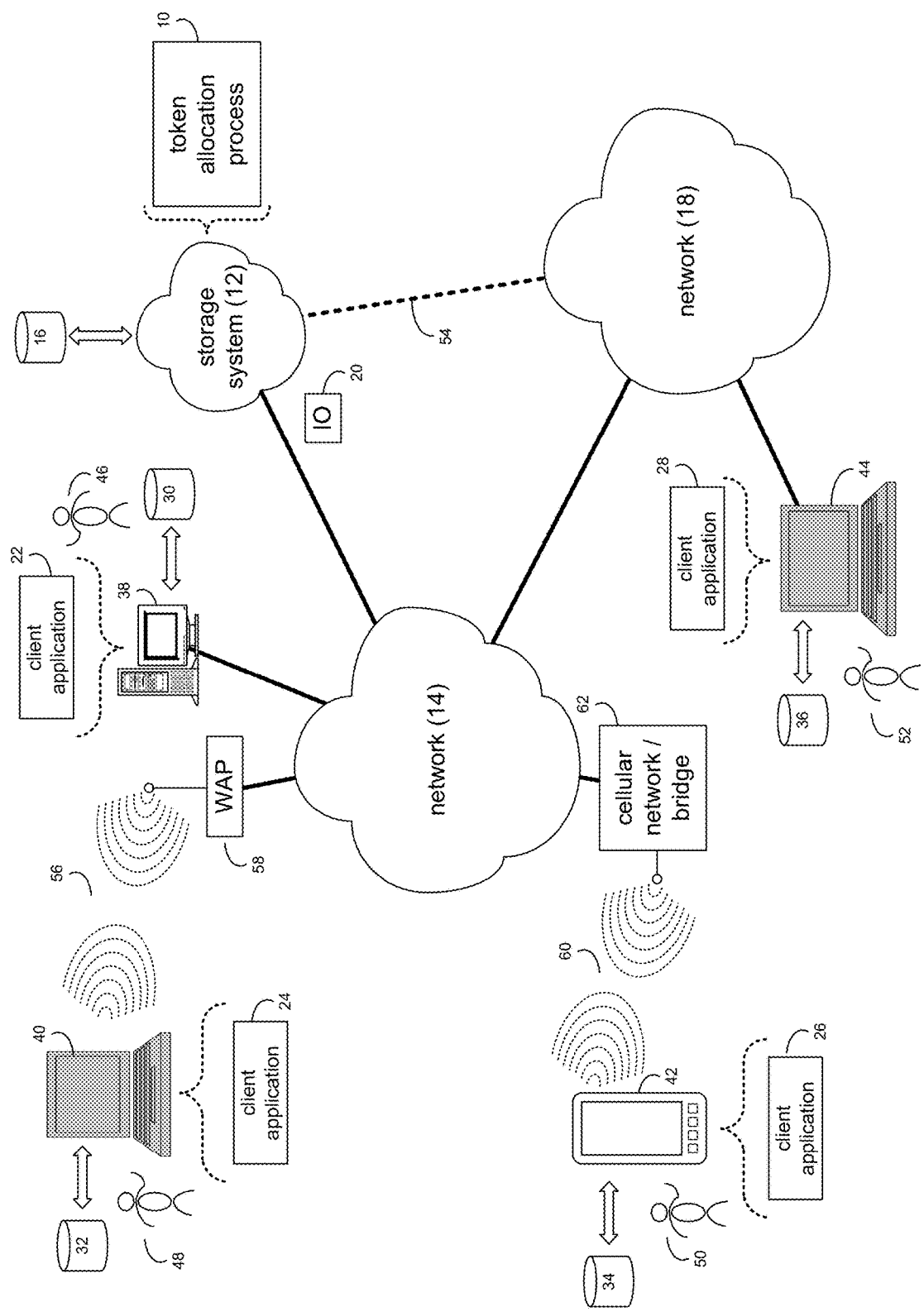
FIG. 1 is an example diagrammatic view of a storage system and a token allocation process coupled to a distributed computing network according to one or more example implementations of the disclosure.

System Overview:

Referring to FIG. 1, there is shown token allocation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of token allocation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of token allocation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a token allocation process, such as token allocation process 10 of FIG. 1, may include but is not limited to, allocating a first number of tokens from a plurality of tokens for processing one or more read IO requests from a read IO queue, thus defining a number of allocated read tokens. A second number of tokens may be allocated from the plurality of tokens for processing one or more write IO requests from a write IO queue, thus defining a number of allocated write tokens. Token allocation process 10 may determine that the processing of the one or more write IO requests from the write IO queue is throttled. In response to determining that the processing of the one or more write IO requests from the write IO queue is throttled, a maximum allowable number of write tokens may be defined. One or more additional tokens may be allocated to the number of allocated read tokens for processing the one or more read IO requests from the read IO queue based upon, at least in part, the maximum allowable number of write tokens and the number of allocated write tokens.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
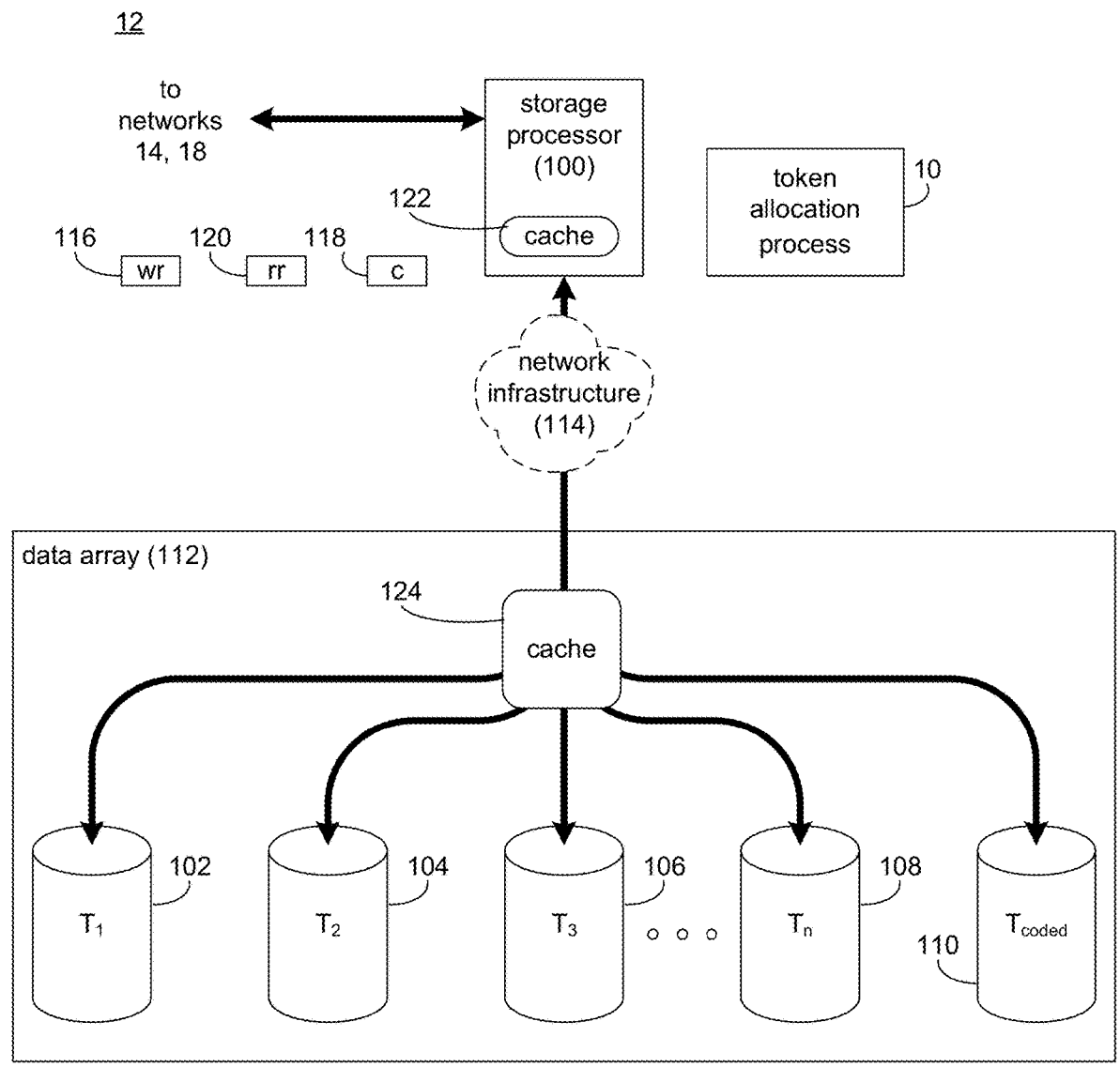
FIG. 2 is an example diagrammatic view of the storage system of FIG. 1 according to one or more example implementations of the disclosure.
Figure 3:
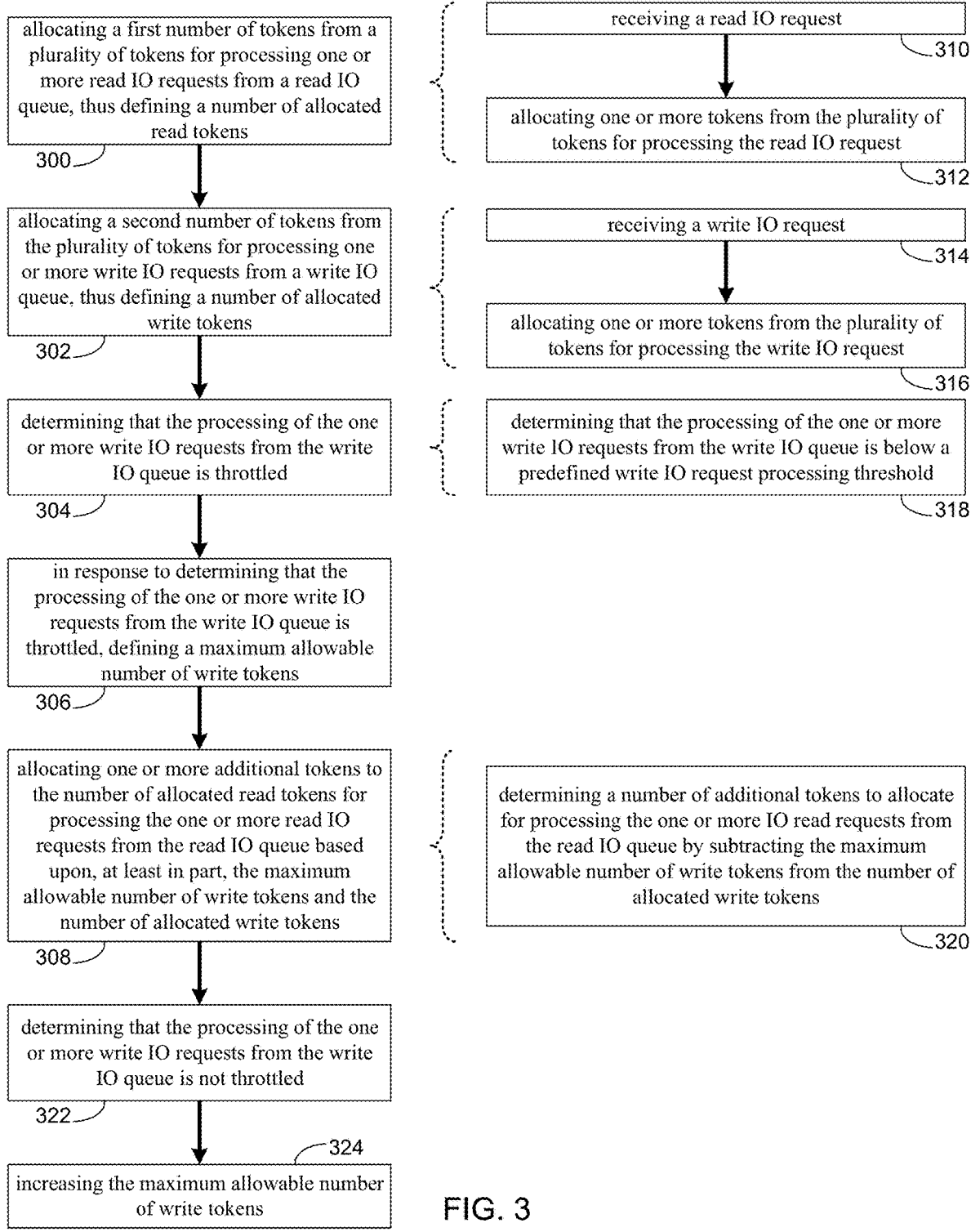
FIG. 3 is an example flowchart of token allocation process according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of token allocation process 10. The instruction sets and subroutines of token allocation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of token allocation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of token allocation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of token allocation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Token Allocation Process:

Referring also to the examples of FIGS. 3-6C and in some implementations, token allocation process 10 may allocate 300 a first number of tokens from a plurality of tokens for processing one or more read IO requests from a read IO queue, thus defining a number of allocated read tokens. A second number of tokens may be allocated 302 from the plurality of tokens for processing one or more write IO requests from a write IO queue, thus defining a number of allocated write tokens. Token allocation process 10 may determine 304 that the processing of the one or more write IO requests from the write IO queue is throttled. In response to determining that the processing of the one or more write IO requests from the write IO queue is throttled, a maximum allowable number of write tokens may be defined 306. One or more additional tokens may be allocated 308 to the number of allocated read tokens for processing the one or more read IO requests from the read IO queue based upon, at least in part, the maximum allowable number of write tokens and the number of allocated write tokens.

As will be discussed in greater detail below, implementations of the present disclosure may allow for the dynamic allocation of additional tokens for processing read IO requests when the processing of write IO requests is throttled. For example and as discussed above, during the processing of input/output (IO) requests on a storage system, the processing of write IO requests may experience delays relative to the processing of read IO requests (i.e., write IO request throttling due to storage resource(s) required by the write IO request). This may result in the inefficient use of other storage resources that, but for the write IO request throttling holding storage resources, would be utilized in the processing of read IO requests. As such, while storage resources (e.g., CPU resources, memory, etc.) allocated for the processing of the write IO requests are not being used (i.e., because of the throttling of the write IO requests), read IO requests are unable to receive the storage resources needed and the overall storage system efficiency may be reduced. Accordingly, token allocation process 10 may allow at least a portion of the storage resources allocated to the processing of write IO requests to be allocated to the processing of read IO requests while the processing of write IO requests is throttled.

As will be discussed below, and referring at least to the example of FIG. 4, token allocation process 10 may allow for the dynamic allocation of additional tokens for processing read IO requests when the processing of write IO requests is throttled. The host input/output (IO) may generally be considered as the IO load from host applications to volumes in the storage system. A "regulator" component (e.g., regulator 400) of token allocation process 10 may be responsible for regulating the execution of host IO and internal background operations. Its goal may be to minimize the impact of executing background operations on host IO performance while also making sure that background operations do not back-up to the internal limits of the system. Background operations may be generally considered as the IO load generated by internal background operations such as, e.g., garbage-collection, volume-delete processing, drive rebuilds, etc. Background operations set the priority of the IO requests they generate based on their needs which change dynamically.

As will be discussed in greater detail below, token allocation process 10 may achieve this by, for example purposes only, distributing scheduling "tokens" to a host IO scheduler (e.g., host IO scheduler 402 that is responsible for selecting volumes and scheduling their IO requests based on QoS settings and fairness to all volumes) and background operation scheduler (e.g., background (BG) IO scheduler 404 that is responsible for selecting which background operations to scheduled next, based on the priority that background operations have set for their IO requests and fairness across all operations) during each scheduling cycle. These schedulers may be responsible for orchestration (e.g., deciding which IO requests to schedule based on the scheduling "tokens" available).

To decide on scheduling "tokens," token allocation process 10 may continuously (or intermittently) determine an input/output (IO) processing load for the storage system. Generally, an executor (e.g., executor 406) may be responsible for executing the operations that both schedulers have selected in each scheduling cycle. The executor may have per-core queues into which schedulers enqueue their operations. As long as a CPU core is available for the executor, it may pick the next operation in that core's queue in FIFO order for execution.

In some implementations, token allocation process 10 may define a token pool size for a storage system token pool associated with a storage system. As discussed above, a storage system token pool may generally include a pool or collection of discrete "tokens" that may define the processing capability of a storage system. As discussed above, an IO request (e.g., a host IO or a background IO) may require a certain amount of resources of the storage system to be executed. In some implementations, token allocation process 10 may allocate storage system resources for the execution of IO requests in the form of tokens.

Figure 4:
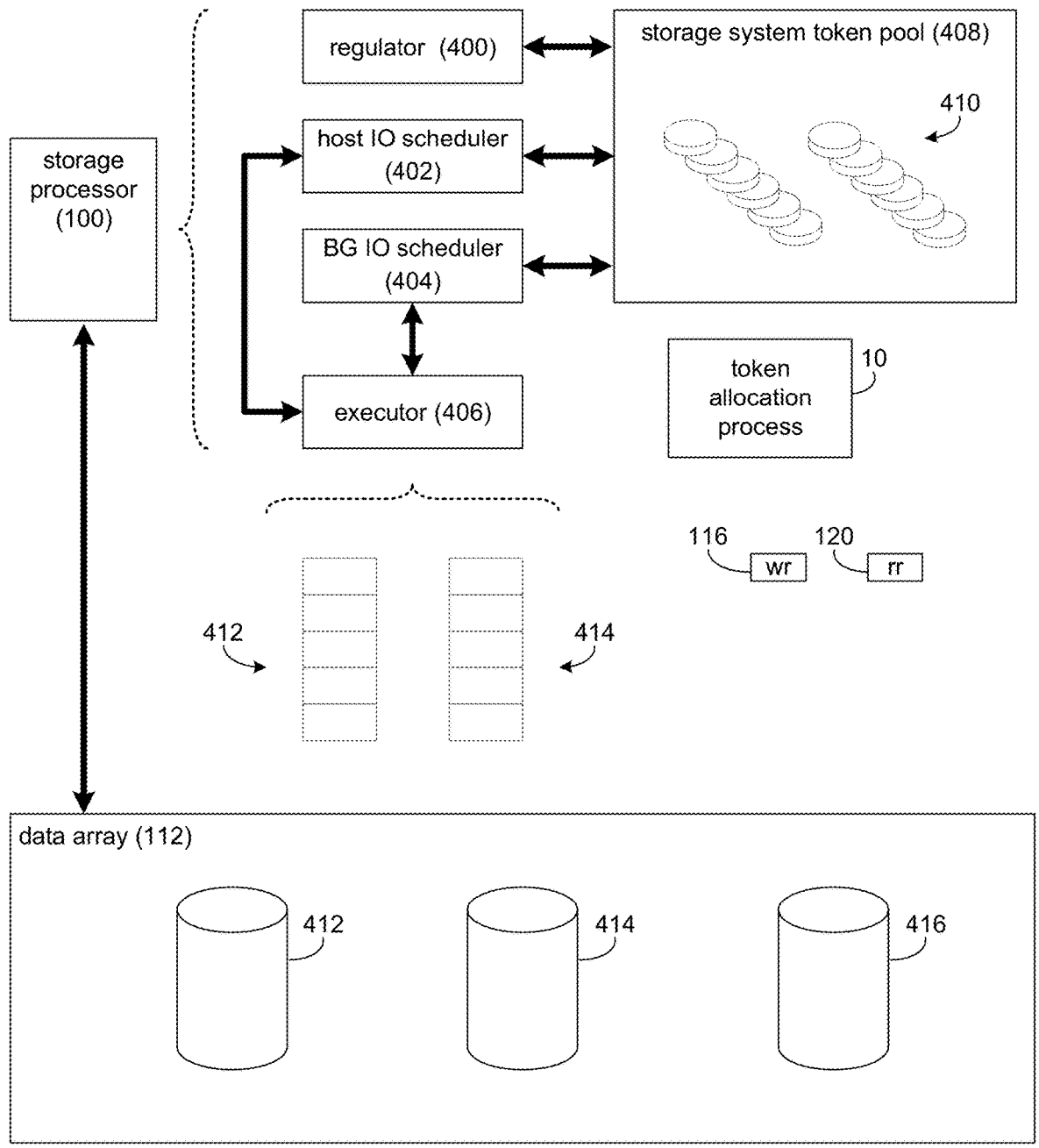
FIG. 4 is an example diagrammatic view of the storage system of FIG. 1 according to one or more example implementations of the disclosure.

Referring again to the example of FIG. 4 and in some implementations, token allocation process 10 may define a token pool size for a storage system token pool (e.g., storage system token pool 408) associated with a storage system (e.g., storage system 12). For example, token allocation process 10 may define the token pool size for storage system token pool 408 as a default number of tokens and/or based upon, at least in part, the hardware and/or software components of storage system 12. In this example, token allocation process 10 may define a token pool size of e.g., 1000 tokens (e.g., plurality of tokens 410). However, it will be appreciated that storage system token pool 408 may include any number of tokens within the scope of the present disclosure.

In some implementations, token allocation process 10 may allocate 300 a first number of tokens from a plurality of tokens for processing one or more read IO requests from a read IO queue, thus defining a number of allocated read tokens. Referring also to FIG. 4 and in some implementations, token allocation process 10 may include one or more read IO queues (e.g., read IO queue 412). A read IO queue (e.g., read IO queue 412) may include an IO queue configured to process only read IO requests. For example, conventional IO queues may be configured to process both read IO requests and write IO requests. As will be discussed in greater detail below, by separating the processing of IO requests into a read IO queue (e.g., read IO queue 412) and a write IO queue (e.g., write IO queue 414), token allocation process 10 may allow read IO requests to be processed independently of write IO requests.

Allocating 300 a first number of tokens from a plurality of tokens for processing one or more read IO requests from a read IO queue may include receiving 310 a read IO request and allocating 312 one or more tokens from the plurality of tokens for processing the read IO request. For example, token allocation process 10 may receive 310 a read IO request (e.g., read IO request 120) and may determine which computing resources are required to process the read IO request (e.g., read IO request 120). As discussed above, token allocation process 10 may allocate 312 one or more tokens from the plurality of tokens (e.g., plurality of tokens 410) for processing the read IO request (e.g., read IO request 120). Tokens may be representative of the storage resources of a storage system that may be allocated or dedicated for the processing of particular IO requests. In one example, depending on the storage resources required to process the read IO request, token allocation process 10 may allocate 300 one or more tokens from the plurality of tokens (e.g., plurality of tokens 410) for processing the read IO request (e.g., read IO request 120).

As will be discussed in greater detail below, when the storage system token pool (e.g., storage system token pool 408) allocates each and every token, token allocation process 10 may be unable to allocate any tokens for the processing of the read IO request (e.g., read IO request 120). While an example of one read IO request has been discussed above, it will be appreciated that any number of read IO requests may be received within the scope of the present disclosure. Additionally, the first number of tokens allocated 300 for processing one or more read IO requests (e.g., read IO request 120) from a read IO queue (e.g., read IO queue 412) may include any number of tokens for any number of read IO requests within the scope of the present disclosure.

In some implementations, token allocation process 10 may allocate 302 a second number of tokens from the plurality of tokens for processing one or more write IO requests from a write IO queue, thus defining a number of allocated write tokens. Referring also to FIG. 4 and in some implementations, token allocation process 10 may include one or more write IO queues (e.g., write IO queue 414). A write IO queue (e.g., write IO queue 414) may include an IO queue configured to process only write IO requests (e.g., write IO request 116). As discussed above, token allocation process 10 may separate the processing of IO requests into a read IO queue (e.g., read IO queue 412) and a write IO queue (e.g., write IO queue 414), token allocation process 10 may allow read IO requests to be processed independently of write IO requests.

Allocating 302 a second number of tokens from the plurality of tokens for processing one or more write IO requests from a write IO queue may include receiving 314 a write IO request and allocating 316 one or more tokens from the plurality of tokens for processing the write IO request. For example, token allocation process 10 may receive 314 a write IO request (e.g., write IO request 116) and may determine which computing resources are required to process the write IO request (e.g., write IO request 116). As discussed above, token allocation process 10 may allocate 316 one or more tokens from the plurality of tokens (e.g., plurality of tokens 410) for processing the write IO request (e.g., write IO request 116). As discussed above, tokens may be representative of the storage resources of a storage system that may be allocated or dedicated for the processing of particular IO requests. In one example, depending on the storage resources required to process the read IO request, token allocation process 10 may allocate 302 one or more tokens from the plurality of tokens (e.g., plurality of tokens 410) for processing the write IO request (e.g., write IO request 116).

As will be discussed in greater detail below, when the storage system token pool (e.g., storage system token pool 408) allocates each and every token, token allocation process 10 may be unable to allocate 302 any tokens for the processing of the write IO request (e.g., write IO request 116). While an example of one write IO request has been discussed above, it will be appreciated that any number of write IO requests may be received within the scope of the present disclosure. Additionally, the second number of tokens allocated 302 for processing one or more write IO requests (e.g., write IO request 116) from a write IO queue (e.g., write IO queue 414) may include any number of tokens for any number of write IO requests within the scope of the present disclosure.

Figure 5A:
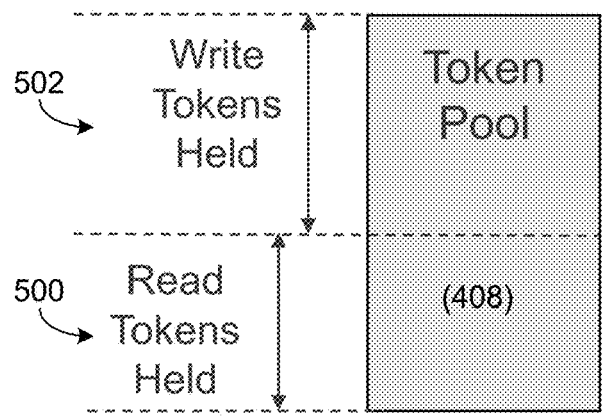
FIGS. 5A-5C are example diagrammatic views of the allocation of tokens from storage system token pool of FIG. 4 over time according to one or more example implementations of the disclosure.

Referring also to FIG. 5A and as discussed above, token allocation process 10 may allocate 300 a first number of tokens (e.g., first number of tokens 500) for processing one or more read IO requests (e.g., read IO request 120) from the read IO queue (e.g., read IO queue 412) in response to receiving one or more read IO requests (e.g., read IO request 120) and may allocate 302 a second number of tokens (e.g., second number of tokens 502) for processing one or more write IO requests (e.g., write IO request 116) from the write IO queue (e.g., write IO queue 414) in response to receiving one or more write IO requests (e.g., write IO request 116). As shown in FIG. 5A at a first point in time, token allocation process 10 may continuously allocate tokens from the plurality of tokens (e.g., plurality of tokens 410) of a storage system token pool (e.g., storage system token pool 408) as read IO requests (e.g., read IO request 120) and write IO requests (e.g., write IO request 116) are received and enqueued (e.g., in read IO queue 412 and write IO queue 414, respectively).

Figure 5B:
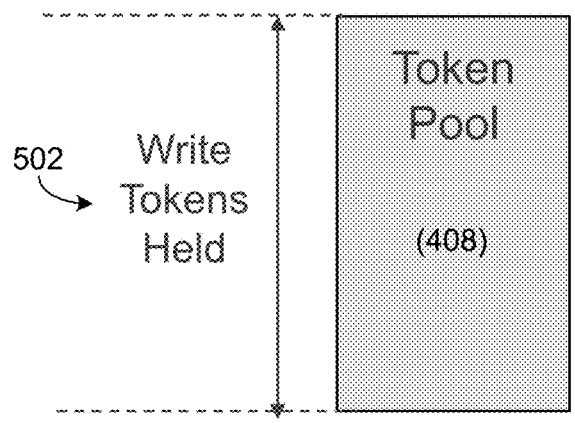

Referring also to FIG. 5B, at a second point in time, suppose that token allocation process 10 processes each of the plurality of read IO requests (e.g., read IO request 120) of the read IO queue (e.g., read IO queue 412). In this example, suppose token allocation process 10 receives additional write IO requests (e.g., write IO request 116) and allocates 302 tokens for the processing of write IO requests on the write IO queue (e.g., write IO queue 414). As the number of write IO requests increases, token allocation process 10 may allocate 302 each token of the plurality of tokens (e.g., plurality of tokens 410) for processing write IO requests. In this manner, the processing of write IO requests may consume all of the available storage resources of the storage system. For example, the write IO requests may consume each of the tokens when data-path resources such as data log or cache are tied and thus impacting any read IO requests from proceeding, leading to unnecessary read latency on client devices.

Figure 5C:
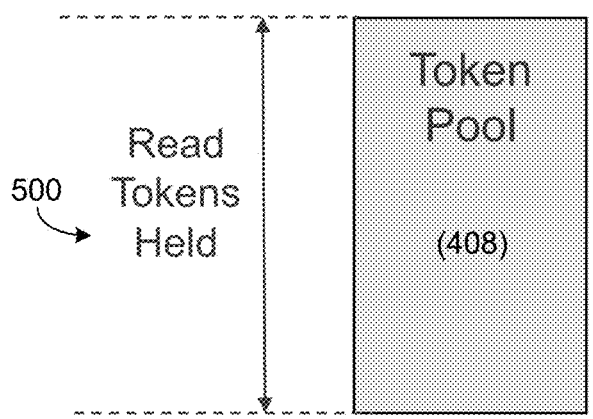

Referring also to FIG. 5C and a third point in time, suppose that token allocation process 10 processes each of the plurality of write IO requests (e.g., write IO request 116) of the write IO queue (e.g., write IO queue 414). In this example, suppose token allocation process 10 receives additional read IO requests (e.g., read IO request 120) and allocates 300 tokens for the processing of read IO requests on the read IO queue (e.g., read IO queue 412). As the number of read IO requests increases, token allocation process 10 may allocate 300 each token of the plurality of tokens (e.g., plurality of tokens 410) for processing read IO requests.

In some implementations, token allocation process 10 may determine 304 that the processing of the one or more write IO requests from the write IO queue is throttled. Write throttling may generally include a state or condition where write IO requests are allocated tokens for processing but experience processing delays. For example, write throttling may occur when write IO requests begin queuing due to a lack of space in a cache or log configured to receive the write IO requests. As such, write throttling may begin when write IO requests queue ahead of being processed in a cache or log, and may end when the write IO queue has emptied.

Determining 304 that the processing of the one or more write IO requests from the write IO queue is throttled may include determining 320 that the processing of the one or more write IO requests from the write IO queue is below a predefined write IO request processing threshold. For example, token allocation process 10 may detect or identify the time required to process write IO requests. Token allocation process 10 may receive a user-defined write IO request processing threshold and/or may automatically define the write IO request processing threshold. The write IO request processing threshold may include a number of write IO requests being processed and/or a number of write IO queues being queued because of a lack of space in a cache or log. In this manner, the write IO request processing threshold may include various thresholds (e.g., a threshold for the number of write IO requests being queued, a threshold number of write IO requests being processed over a predefined period of time, etc.). Accordingly, token allocation process 10 may utilize various predefined write IO request thresholds to determine 304 that the processing of the one or more write IO requests from the write IO queue is throttled within the scope of the present disclosure.

Additionally, token allocation process 10 may receive a write throttle signal or warning from an internal component and/or from an external software, firmware, and/or hardware component configured to monitor the write IO queue (e.g., write IO queue 414) for write throttling. As such, it will be appreciated that token allocation process 10 may determine 304 that the processing of the one or more write IO requests from the write IO queue is throttled in various ways within the scope of the present disclosure.

In some implementations and in response to determining 304 that the processing of the one or more write IO requests from the write IO queue is throttled, token allocation process 10 may define 306 a maximum allowable number of write tokens. The maximum allowable number of write tokens may represent the maximum number of tokens to allocate for the processing of the one or more write IO requests from the write IO queue when the processing of write IO requests is throttled. The maximum allowable number of write tokens may be a default value, a user-defined value, and/or an automatically and/or dynamically defined value. For example, the maximum allowable number of write tokens may be a percentage of the total number of tokens of the plurality of tokens. In this example, the maximum allowable number of tokens may change with any modifications in the plurality of tokens (e.g., plurality of tokens 410) within the storage system token pool (e.g., storage system token pool 408). In another example, the maximum allowable number of write tokens may be a predefined number of tokens. Accordingly, it will be appreciated that the maximum allowable number of write tokens may be defined in various ways within the scope of the present disclosure.

Token allocation process 10 may allocate 308 one or more additional tokens to the number of allocated read tokens for processing the one or more read IO requests from the read IO queue based upon, at least in part, the maximum allowable number of write tokens and the number of allocated write tokens. For example, while the processing of write IO requests is throttled, write IO requests allocated with tokens from the plurality of tokens may not be utilizing the allocated storage system resources. This may prevent read IO requests from being allocated with tokens for processing and may result in periods of less efficient storage resource utilization as throttled write IO requests may not utilize their allocated tokens. Accordingly, token allocation process 10 may allocate 308 one or more additional tokens to the number of allocated read tokens for processing the one or more read IO requests using the maximum allowable number of write tokens and the number of allocated write tokens. As will be described in greater detail below, token allocation process 10 may utilize the maximum allowable number of write tokens and the number of allocated write tokens to determine how many additional tokens to allocate for the processing of read IO requests.

Allocating 308 one or more additional tokens to the number of allocated read tokens for processing the one or more read IO requests from the read IO queue based upon, at least in part, the maximum allowable number of write tokens and the number of allocated write tokens may include determining 320 a number of additional tokens to allocate for processing the one or more IO read requests from the read IO queue by subtracting the maximum allowable number of write tokens from the number of allocated write tokens. For example, while the write IO requests are throttled, the storage system resources allocated to the write IO requests (as represented by the second number of allocated tokens) may be unutilized or underutilized.

Accordingly, token allocation process 10 may define a "read credit" for additional tokens to be allocated for the processing of read IO requests. Token allocation process 10 may determine 320 the number of additional tokens to allocate for the processing of read IO requests by determining the number of allocated write tokens and subtracting the maximum allowable number of write tokens from the number of allocated write tokens. In this manner, token allocation process 10 may determine preserve enough tokens (e.g., a maximum allowable number of write tokens) for the processing of write IO requests by allocating the remaining tokens. Accordingly, token allocation process 10 may allocate 308 the one or more additional tokens for the processing of read IO requests without de-allocating the tokens from the write IO requests. Instead and because of write throttling, the storage system resources that are not being utilized for the processing of the throttled write IO requests may be used for the processing of read IO requests. In this manner, token allocation process 10 may allow the storage system to address write IO throttling without wasting storage system resources of the storage system.

Figure 6A:
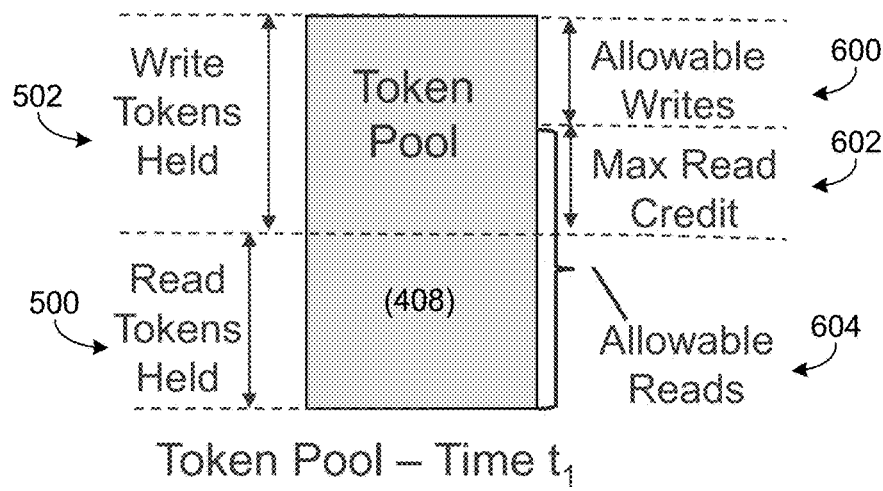
FIGS. 6A-6C are example diagrammatic views of the allocation of tokens from storage system token pool of FIG. 4 over time according to one or more example implementations of the disclosure.

Referring also to FIG. 6A, suppose that the storage system token pool (e.g., storage system token pool 408) includes e.g., 1000 tokens (e.g., plurality of tokens 410) at a first point in time. As discussed above, suppose token allocation process 10 allocates 300 a first number of tokens (e.g., first number of tokens 500) for the processing of one or more read IO requests and allocates 302 a second number of tokens (e.g., second number of tokens 502) for the processing of one or more write IO requests. In this example, suppose token allocation process 10 allocates 300 e.g., 500 tokens for the processing of one or more read IO requests and allocates 302 e.g., 500 tokens for the processing of one or more write IO requests.

Now suppose that token allocation process 10 determines 304 that processing of the one or more write IO requests is throttled. Accordingly, token allocation process 10 may define 306 a maximum allowable number of write tokens (e.g., maximum allowable number of write tokens 600). In this example, suppose that the maximum allowable number of write tokens (e.g., maximum allowable number of write tokens 600) is defined 306 at e.g., 20% of the size of the token pool (e.g., storage system token pool 408). Accordingly, token allocation process 10 may define 306 the maximum allowable number of write tokens (e.g., maximum allowable number of write tokens 600) as e.g., 200 tokens for the processing of one or more write IO requests.

Continuing with the above example, token allocation process 10 may determine 320 a number of additional tokens to allocate for processing the one or more IO read requests from the read IO queue by subtracting the maximum allowable number of write tokens (e.g., maximum allowable number of write tokens 600) from the number of allocated write tokens (e.g., number of allocated write tokens 502). For example, token allocation process 10 may subtract the maximum allowable number of write tokens (e.g., 200 tokens) from the number of allocated write tokens (e.g., 500 tokens). Accordingly, token allocation process 10 may determine 320 that e.g., 300 additional tokens (e.g., 500−200=300) (e.g., additional tokens 602) may be allocated 308 for the processing of read IO requests while the write IO requests are throttled. As shown in the example of FIG. 6A, the additional number of tokens may define a "read credit" (e.g., 300 tokens) that may be utilized for the processing of read IO requests from the read IO queue. In this manner, the number of allowable read tokens (e.g., number of allowable read tokens 604) may include the total number of tokens of the storage system token pool (e.g., storage system token pool 408) less the maximum allowable number of write tokens (e.g., maximum allowable number of write tokens 600).

Figure 6B:
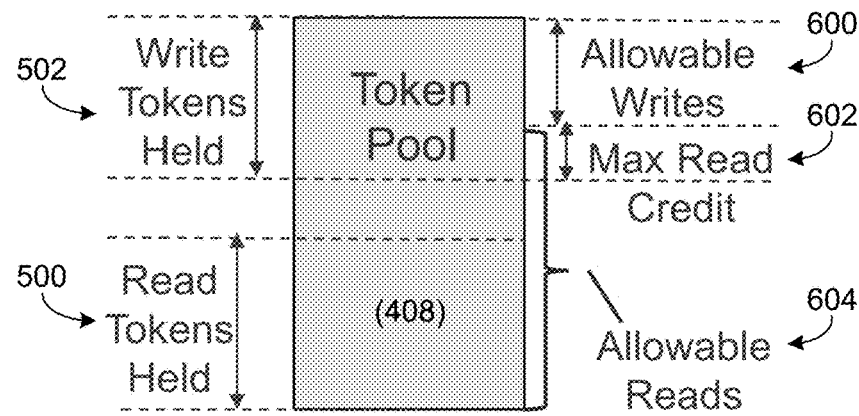

Referring also to FIG. 6B at a second point of time and continuing with the above example, token allocation process 10 may determine 304 that the processing of the one or more write IO requests is throttled. Accordingly, token allocation process 10 may determine 320 a number of additional tokens (e.g., additional tokens 602) to allocate for processing the one or more IO read requests from the read IO queue by subtracting the maximum allowable number of write tokens (e.g., maximum allowable number of write tokens 600) from the number of allocated write tokens (e.g., number of allocated write tokens 502). For example, token allocation process 10 may subtract the maximum allowable number of write tokens (e.g., 200 tokens) from the current number of allocated write tokens at the second point of time (e.g., 400 tokens). Accordingly, token allocation process 10 may determine 320 that e.g., 200 additional tokens (e.g., 400−200=200) may be allocated 308 for the processing of read IO requests while the write IO requests are throttled. As shown in the example of FIG. 6B, the additional number of tokens (e.g., additional tokens 602) may be reduced as the number of allocated write tokens decreases (e.g., when write IO requests are processed, the allocated tokens are returned to the storage system token pool (e.g., storage system token pool 408) for re-allocation).

Figure 6C:
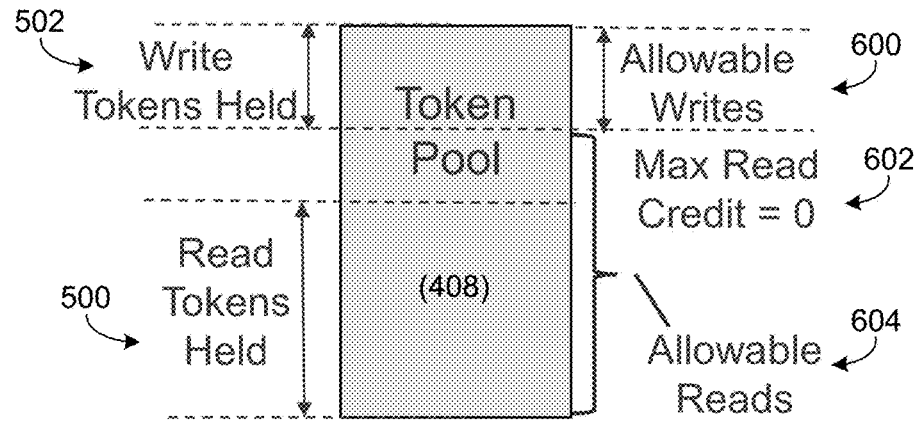

Referring also to FIG. 6C at a third point in time and continuing with the above example, token allocation process 10 may determine 304 that the processing of the one or more write IO requests is throttled. Accordingly, token allocation process 10 may determine 320 a number of additional tokens to allocate for processing the one or more IO read requests from the read IO queue by subtracting the maximum allowable number of write tokens from the number of allocated write tokens. For example, token allocation process 10 may subtract the maximum allowable number of write tokens (e.g., 200 tokens) from the current number of allocated write tokens (e.g., 200 tokens) at the third point in time. Accordingly, token allocation process 10 may determine 320 that e.g., 0 additional tokens (e.g., 200−200=0) may be allocated 308 for the processing of read IO requests while the write IO requests are throttled. As shown in the example of FIG. 6C, once the number of allocated write tokens (e.g., number of allocated write tokens 502) is equal to the maximum allowable number of write tokens (e.g., maximum allowable number of write tokens 600), token allocation process 10 may cease allocating 308 additional tokens for the processing of read IO requests.

In some implementations, token allocation process 10 may determine 322 that the processing of the one or more write IO requests from the write IO queue is not throttled. For example, token allocation process 10 may determine 322 that the processing of the one or more write IO requests surpasses the predefined write IO request processing threshold. In this example, token allocation process 10 may determine 322 that the processing of the one or more write IO requests from the write IO queue is not throttled or no longer throttled. In another example, token allocation process 10 may receive a signal or other indication that the write IO requests are not throttled in the storage system.

In response to determining that the processing of the one or more write IO requests from the write IO queue is not throttled, token allocation process 10 may increase 324 the maximum allowable number of write tokens. For example, token allocation process 10 may adjust the maximum allowable number of write tokens by gradually or incrementally increasing 324 the maximum allowable number of write tokens by a predefined amount of tokens over a predefined period of time. In this manner, token allocation process 10 may gradually adjust the maximum allowable number of write tokens after exiting write IO throttling. Accordingly, token allocation process 10 may not immediately remove the limitation of the maximum allowable number of write tokens. In one example and as write tokens are returned, the maximum allowable number of write tokens may be increased by a predefined percentage or series of percentages of the tokens returned as long as write IO requests are still queued. In another example and after a predefined period of time, the maximum allowable number of write tokens may be removed if not already at the token pool size.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   allocating a first number of tokens from a plurality of tokens for processing one or more read IO requests from a read IO queue, thus defining a number of allocated read tokens;
   allocating a second number of tokens from the plurality of tokens for processing one or more write IO requests from a write IO queue, thus defining a number of allocated write tokens;
   determining that the processing of the one or more write IO requests from the write IO queue is throttled;
   in response to determining that the processing of the one or more write IO requests from the write IO queue is throttled, defining a maximum allowable number of write tokens;
   allocating one or more additional tokens to the number of allocated read tokens when the processing of the one or more write IO requests is throttled for processing the one or more read IO requests from the read IO queue based upon, at least in part, the maximum allowable number of write tokens and the number of allocated write tokens,
   wherein the allocation of the one or more additional tokens for the processing of read IO requests ceases once the number of allocated write tokens is equal to the maximum allowable number of write tokens;
   determining that the processing of the one or more write IO requests from the write IO queue is not throttled; and
   in response to determining that the processing of the one or more write IO requests from the write IO queue is not throttled, adjusting the maximum allowable number of write tokens by gradually or incrementally increasing the maximum allowable number of write tokens by a predefined amount of tokens over a predefined period of time.

2. The computer-implemented method of claim 1, wherein allocating a first number of tokens from a plurality of tokens for processing one or more read IO requests from a read IO queue includes:
   receiving a read IO request; and
   allocating one or more tokens from the plurality of tokens for processing the read IO request.

3. The computer-implemented method of claim 1, wherein allocating a second number of tokens from the plurality of tokens for processing one or more write IO requests from a write IO queue includes:
   receiving a write IO request; and
   allocating one or more tokens from the plurality of tokens for processing the write IO request.

4. The computer-implemented method of claim 1, wherein determining that the processing of the one or more write IO requests from the write IO queue is throttled includes determining that the processing of the one or more write IO requests from the write IO queue is below a predefined write IO request processing threshold.

5. The computer-implemented method of claim 1, wherein the maximum allowable number of write tokens is a percentage of the total number of tokens of the plurality of tokens.

6. The computer-implemented method of claim 1, wherein allocating one or more additional tokens to the number of allocated read tokens for processing the one or more read IO requests from the read IO queue based upon, at least in part, the maximum allowable number of write tokens and the number of allocated write tokens includes:
   determining a number of additional tokens to allocate for processing the one or more IO read requests from the read IO queue by subtracting the maximum allowable number of write tokens from the number of allocated write tokens.

7. A computer program product residing on a non-transitory computer readable medium having a plurality of instructions stored thereon which, when executed by a processor, cause the processor to perform operations comprising:
   allocating a first number of tokens from a plurality of tokens for processing one or more read IO requests from a read IO queue, thus defining a number of allocated read tokens;
   allocating a second number of tokens from the plurality of tokens for processing one or more write IO requests from a write IO queue, thus defining a number of allocated write tokens;
   determining that the processing of the one or more write IO requests from the write IO queue is throttled;
   in response to determining that the processing of the one or more write IO requests from the write IO queue is throttled, defining a maximum allowable number of write tokens;
   allocating one or more additional tokens to the number of allocated read tokens when the processing of the one or more write IO requests is throttled for processing the one or more read IO requests from the read IO queue based upon, at least in part, the maximum allowable number of write tokens and the number of allocated write tokens,
   wherein the allocation of the one or more additional tokens for the processing of read IO requests ceases once the number of allocated write tokens is equal to the maximum allowable number of write tokens;
   determining that the processing of the one or more write IO requests from the write IO queue is not throttled; and
   in response to determining that the processing of the one or more write IO requests from the write IO queue is not throttled, adjusting the maximum allowable number of write tokens by gradually or incrementally increasing the maximum allowable number of write tokens by a predefined amount of tokens over a predefined period of time.

8. The computer program product of claim 7, wherein allocating a first number of tokens from a plurality of tokens for processing one or more read IO requests from a read IO queue includes:
   receiving a read IO request; and
   allocating one or more tokens from the plurality of tokens for processing the read IO request.

9. The computer program product of claim 7, wherein allocating a second number of tokens from the plurality of tokens for processing one or more write IO requests from a write IO queue includes:
   receiving a write IO request; and
   allocating one or more tokens from the plurality of tokens for processing the write IO request.

10. The computer program product of claim 7, wherein determining that the processing of the one or more write IO requests from the write IO queue is throttled includes determining that the processing of the one or more write IO requests from the write IO queue is below a predefined write IO request processing threshold.

11. The computer program product of claim 7, wherein the maximum allowable number of write tokens is a percentage of the total number of tokens of the plurality of tokens.

12. The computer program product of claim 7, wherein allocating one or more additional tokens to the number of allocated read tokens for processing the one or more read IO requests from the read IO queue based upon, at least in part, the maximum allowable number of write tokens and the number of allocated write tokens includes:
   determining a number of additional tokens to allocate for processing the one or more IO read requests from the read IO queue by subtracting the maximum allowable number of write tokens from the number of allocated write tokens.

13. A computing system comprising:
   a memory; and
   a processor configured to allocate a first number of tokens from a plurality of tokens for processing one or more read IO requests from a read IO queue, thus defining a number of allocated read tokens, wherein the processor may be further configured to allocate a second number of tokens from the plurality of tokens for processing one or more write IO requests from a write IO queue, thus defining a number of allocated write tokens, wherein the processor is further configured to determine that the processing of the one or more write IO requests from the write IO queue is throttled, wherein the processor is further configured to, in response to determining that the processing of the one or more write IO requests from the write IO queue is throttled, define a maximum allowable number of write tokens, wherein the processor is further configured to allocate one or more additional tokens to the number of allocated read tokens when the processing of the one or more write IO requests is throttled for processing the one or more read IO requests from the read IO queue based upon, at least in part, the maximum allowable number of write tokens and the number of allocated write tokens, wherein the allocation of the one or more additional tokens for the processing of read IO requests ceases once the number of allocated write tokens is equal to the maximum allowable number of write tokens, wherein the processor is further configured to determine that the processing of the one or more write IO requests from the write IO queue is not throttled, and wherein the processor is further configured to, in response to determining that the processing of the one or more write IO requests from the write IO queue is not throttled, adjust the maximum allowable number of write tokens by gradually or incrementally increasing the maximum allowable number of write tokens by a predefined amount of tokens over a predefined period of time.

14. The computing system of claim 13, wherein allocating a first number of tokens from a plurality of tokens for processing one or more read IO requests from a read IO queue includes:
  receiving a read IO request; and
  allocating one or more tokens from the plurality of tokens for processing the read IO request.

15. The computing system of claim 13, wherein allocating a second number of tokens from the plurality of tokens for processing one or more write IO requests from a write IO queue includes:
  receiving a write IO request; and
  allocating one or more tokens from the plurality of tokens for processing the write IO request.

16. The computing system of claim 13, wherein determining that the processing of the one or more write IO requests from the write IO queue is throttled includes determining that the processing of the one or more write IO requests from the write IO queue is below a predefined write IO request processing threshold.

17. The computing system of claim 13, wherein the maximum allowable number of write tokens is a percentage of the total number of tokens of the plurality of tokens.

18. The computing system of claim 13, wherein allocating one or more additional tokens to the number of allocated read tokens for processing the one or more read IO requests from the read IO queue based upon, at least in part, the maximum allowable number of write tokens and the number of allocated write tokens includes:
  determining a number of additional tokens to allocate for processing the one or more IO read requests from the read IO queue by subtracting the maximum allowable number of write tokens from the number of allocated write tokens.

* * * * *